United States Patent

Houtz

[15] 3,677,613
[45] July 18, 1972

[54] SELF ALIGNING AND SELF ADJUSTING THRUST BUSHING ASSEMBLY

[72] Inventor: Kenneth E. Houtz, Streamwood, Ill.

[73] Assignee: International Harvester Company, Chicago, Ill.

[22] Filed: May 21, 1971

[21] Appl. No.: 145,674

[52] U.S. Cl. ................................................308/135
[51] Int. Cl. ............................................F16c 17/10
[58] Field of Search .........................308/135, 160

[56] References Cited

UNITED STATES PATENTS 3,434,766 3/1969 Kampert et al. ..................308/135

Primary Examiner—Martin P. Schwadron
Assistant Examiner—Frank Susko
Attorney—Floyd B. Harman

[57] ABSTRACT

A self aligning and self adjusting thrust bushing assembly for pivotally connecting a pair of frame sections, such as those on an articulated tractor, including a clevis and a hinge plate with a hinge pin extending through the clevis and plate to define a pivot axis. An annular cylinder and piston assembly surrounds the pin and is connected with a source of hydraulic fluid pressure. A check valve permits flow of fluid only into the cylinder.

12 Claims, 1 Drawing Figure

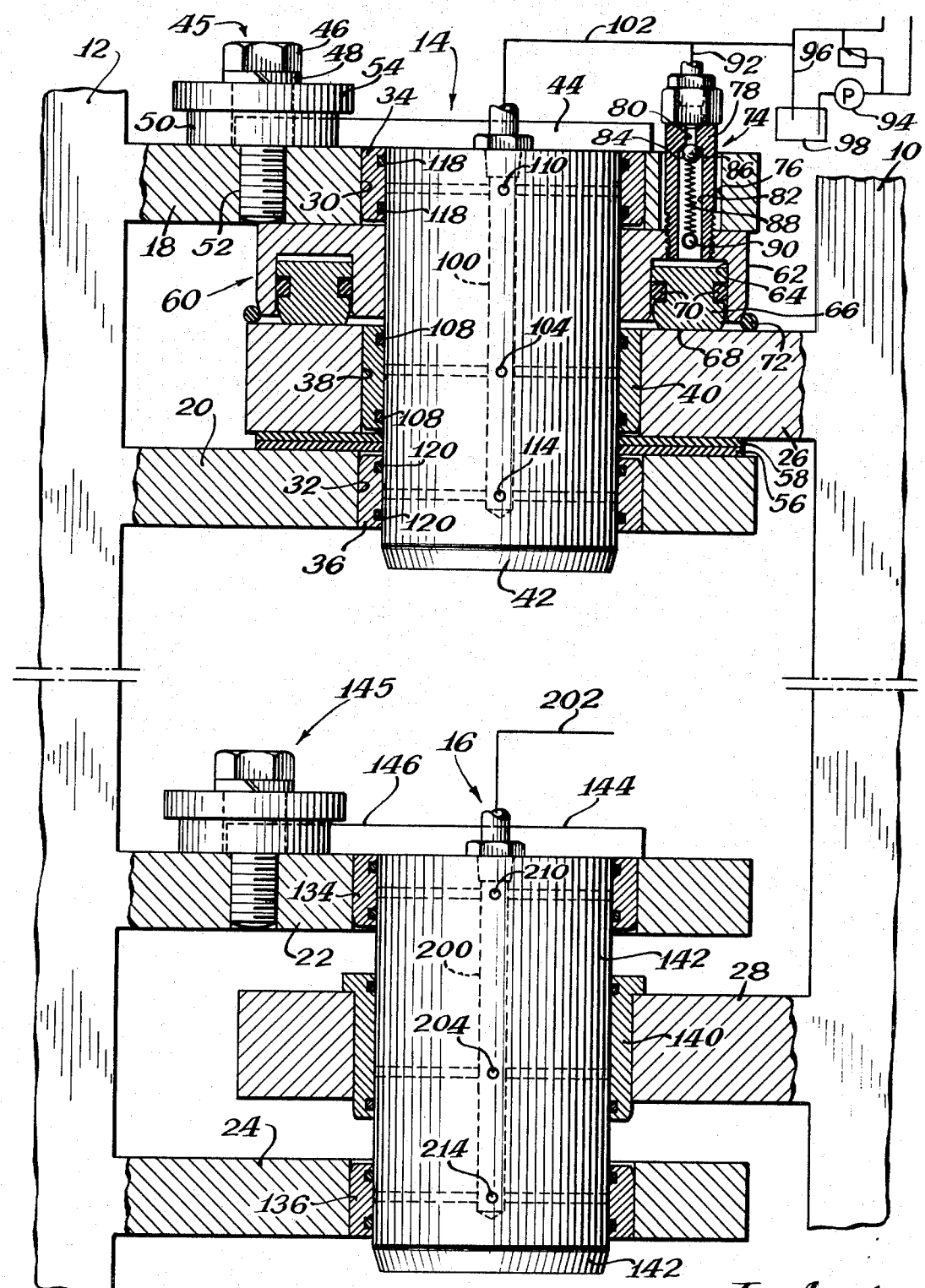

SELF ALIGNING AND SELF ADJUSTING THRUST BUSHING ASSEMBLY

CROSS REFERENCE TO RELATED PATENTS

This invention is related to the inventions disclosed in U.S. Pats. No. 3,411,809, issued Nov. 19, 1968, and 3,434,766, issued Mar. 25, 1969.

BACKGROUND AND SUMMARY OF THE INVENTION

This invention relates generally to a self aligning and self adjusting bushing assembly adapted to carry thrust loads between two plain surfaces disposed in substantially parallel, spaced apart relationship.

The thrust bushing assembly of this invention has general application as a load-carrying member between two plain surfaces which are substantially parallel and adapted for relative rotation about an axis generally perpendicular to the surfaces. Examples of applications for this invention include the thrust bushings for the center hinge of an articulated vehicle, and for the bolster, or swivel support, for the rear axle of a vehicle. Among the problems encountered in these applications are: "dynamic misalignment" of the interconnected plain surfaces arising from fabrication errors, the requirement for the hinge or swivel to carry combined radial and axial loads of a large magnitude, and the desirability for providing axial growth in the bushing assembly in order to facilitate the initial connection or assembly thereof and to adjust for wear between the relative rotatable members. Structures disclosed in the related patents provided solutions to the aforementioned problems, but required periodic adjustment or servicing and, to maintain proper adjustment, reliance was placed upon human judgment to determine both when and how much adjustment was necessary. Lubrication is also a necessary part of service for the prior art devices and required frequent periodic attention.

Accordingly, it is an object of the present invention to provide a thrust bushing assembly adapted to carry axial loads between two relatively rotating plain surfaces wherein the bushing assembly automatically compensates for mislaignment and automatically adjusts to compensate for wear.

Another object is to provide a self aligning thrust bushing assembly which automatically compensates for wear continuously and as frequently as such compensation is necessary.

Another object is to provide a self aligning thrust bushing assembly which is automatically self lubricating.

Still another object of this invention is to provide a bushing assembly which is automatically self lubricating at those locations where relative rotation normally takes place and which lubricates those locations at which relative rotation normally does not occur, in order to prevent galling thereof.

These and other objects and advantages of the present invention will become more readily apparent by reference to the following specification and accompanying drawing in which the sole FIGURE is a side elevational, cross sectional view of the center hinge interconnecting the frame sections of an articulated vehicle incorporating a pin assembly having a pair of bushing assemblies embodying features of the present invention.

DESCRIPTION OF A PREFERRED EMBODIMENT

The sole figure of the drawing illustrates a preferred embodiment of the present invention in which the bushing assemblies are mounted between the interleaved and substantially horizontal center hinge bearing surfaces on the frame sections 10 and 12 of an articulated vehicle. It is contemplated that the thrust bushing assembly may be adapted for use with other embodiments in which the parallel plain surfaces rotate about a pivot axis, such as the rear axle swivel support for a vehicle, under which conditions the axis would be horizontal, as compared to the vertical alignment of the axis of the center pin embodiment.

The articulated vehicle comprises front frame section 10 and rear frame section 12 pivotally interconnected by means of a center hinge comprising substantially, axially aligned, vertically spaced upper pin assembly 14 and lower pin assembly 16. For purposes of clarity, the pin assemblies are illustrated closer together than would be the case in an actual construction.

Each pin assembly pivotally interconnects the frame sections through supports secured to the frame sections. Thus, the supports secured to the rear frame section 12 comprise an upper clevis including a pair of vertically spaced arms or hinge plates 18 and 20 and a lower clevis including a pair of vertically spaced arms or hinge plates 22 and 24. The supports on the front frame section 10 comprise an upper tongue member or hinge plate 26 interleaved with the arms of the upper clevis and a lower tongue member or hinge plate 28 interleaved with the arms of the lower clevis. Referring to the upper pin assembly 14, a pair of aligned bores 30 and 32 are formed respectively in the arms 18 and 20, and sleeve bushings 34 and 36 are pressed into the bores 30 and 32 respectively. The tongue 26 is also provided with a bore 38 into which a bearing 40 is press fit. A hinge pin 42 extends through the bearings 30, 32 and 38. A plate 44 is secured to the upper end of the pin 42 and is provided with a radially extending ear 46. The ear is locked to the upper arm 18 by a cam and bolt arrangement similar to that disclosed in FIG. 5 of U.S. Pat. No. 3,411,809. Specifically, a bolt 46 extends through a lock washer 48 and a cam 50 and threadedly engages a tapped hole 52 formed in the upper arm 18. The cam 50 is provided with a shoulder 54 which overlies the arm 46 to prevent the plate 44 and the hinge pin 42 from working upward out of the bushings 30, 32 and 38. Tightening the bolt 46 causes rotation of the eccentric cam 50 and firmly wedges the ear 46 between the outer surface of the cam and a lug, not shown, secured to the upper surface of the arm 18. The hinge pin 32 is thereby locked with respect to the arms 18 and 20 in the upper clevis.

A pair of annular bearing plates 56 and 58, having an internal diameter greater than the external diameter of the hinge pin 42 to prevent wear of the hinge pin by the bearing plates, are positioned around the hinge pin 42 between the upper surface of the lower arm 20 and the lower surface of the tongue 26. These bearing plates are provided with plane mating surfaces so that the frictional resistance to rotation is minimized. That is, articulation of the upper hinge assembly is provided by relative rotation between the two bearing plates 56 and 58. These bearing plates may, for example, be formed of molded elastomer, such as urethane. A type of urethane that has been found to be satisfactory is du Pont Adiprene at 75 Shore "D" hardness. High contact pressure grease applied between the bearing plates during assembly produces adequate lubrication for the life of the bearing assembly.

Interposed between the lower surface of the upper arm 18 and the upper surface of the tongue 26 is an annular cylinder and piston assembly 60. This assembly includes an annular member 62 having an annular cylindrical cavity 64 which receives an annular piston 66. The piston 66 has a flat lower surface 68 which is engageable with the upper surface of the tongue 26. The piston 66 has a sloppy or loose fit with the cylinder cavity 64 to permit small angling or cocking of the piston relative to the cavity. A pair of O-rings 70 seated in annular grooves in the piston sealingly engage the side walls of the cylindrical cavity 64. The ability of the piston 66 to cock without binding within the cylinder 64, coupled with the low l/d (length to diameter) ratio permits compensation for misalignment of the various components. That is, the bearing 40 having the low l/d ratio and being constructed of a material, such as a bronze alloy, which will plastically deform under load, coupled with the ability of the piston to angle or cock, will compensate for misalignment between the axis of the bearing 38 and the axis of the pin 32, for example. In addition, the urethane plates 56 and 58 will plastically deform to accommodate said misalignment. Because of the normal force between the surface 68 and the tongue 26, as will hereinafter be explained, and due to the presence of lubricating oil in the cavity 64, articulation of the hinge assembly 14 will cause the piston 66 to rotate within the cavity 64. An O-ring 72 seals against the top of the tongue 26 and the lower edge of the annular member 62 to prevent the entry of dirt and other contaminants.

A check valve assembly 74 extends through an opening 76 in the upper arm 18. This assembly 74 is secured to the annular member 62 and provides fluid communication with the annular cavity 64. The check valve assembly 74 includes a body member 78 having its lower end threaded to engage a tapped hole in the annular member 62 is provided with an axial bore 80 and a counterbore 82 forming a seat 84, which is capable of sealingly receiving a ball valve 86. The spring 88 is trapped between the ball 86 and a roll pin 90 secured in the body member 78 and urges the ball 86 against the seat 84. The counterbore 82 is in fluid communication with the cavity 64 and the bore 80 is in fluid communication with a conduit 92. Hydraulic fluid under pressure is provided to the conduit 92, which hydraulic fluid pressure may, for example, be provided by the return conduit of a pressurized reservoir hydraulic circuit on the tractor. Illustrated schematically, a hydraulic circuit is shown as including a pump 94 and a return conduit 96 communicating with a pressurized reservoir 98. The reservoir 98 may, for example, be pressurized to 15 psig which would be provided to the valve assembly 74 through the connection of conduit 92 with the return conduit 96.

Following initial assembly of the hinge assembly 14, operation of the pump 94 will supply hydraulic fluid pressure through the return conduit 96 and conduit 92 to the bore 80, which pressure will then be able to unseat the ball valve 86 to supply hydraulic fluid to the cavity 64. The annular piston 66 will thereby be extended forcing the tongue 26 against the bearing plates 56 and 58 and the lower arm 20. As soon as the annular piston 66 has been extended to take up all of the slack in the hinge assembly, the pressures will equalize on each side of the ball valve 86 permitting the spring 88 to force the ball 86 against the seat 84. The hydraulic fluid within the cavity 64 and the counterbore 82 will then be trapped permitting the hinge assembly to withstand the axial loads imposed thereon during operation of the tractor. As wear occurs in the members due to articulation of the joint, the pressure within the cavity 64 and counterbore 82 will be reduced permitting the constantly available pressure within the bore 80 to unseat the ball valve 86 supplying incremental amounts of additional hydraulic fluid to effect adjustment of the annular piston 66 to compensate for that wear. It is to be noted that this vertical adjustment to compensate for small increments of wear that occur in the relatively movable parts, is substantially instantaneous and perpetual. There is no need for an operator to determine when adjustment is necessary and also to determine the degree of adjustment required.

During articulation of the hinge assembly, there is relative rotation between the bushing 40 and the hinge pin 42. Obviously lubrication is desirable for these relatively rotatable parts. Such lubrication is provided by an axial bore 100 in the hinge pin 42 which communicates with a conduit 102 connected with the return conduit 96. Radial cross bores 104 provide communication between the axial bore 100 and the clearance space between the outer diameter or O.D. of the pin 42 and the inter diameter or I.D. of the bushing 40. O-rings 108 seated in grooves at either end of the bushing 40 sealingly engage the hinge pin 42 to retain the lubricating hydraulic fluid emmanating from the crossbores 104 between the mating surfaces between the bushing 40 and the hinge pin 42.

The bushings 30 and 32 are in affect secured to the arms 18 and 20 and would appear to be stationary with respect to the hinge pin 42 since the hinge pin is secured to the upper arm through the bolt assembly 45, which is mounted on the upper arm 18. However, there is often slight radial clearances between these bushings 30 and 32 and the hinge pin 42, and in addition clearances can develop between the cam and the ear 46 on the plate 44. These radial clearances will permit slight rotation and some slight amount of radial movement of the pin 42 relative to the bushings 30 and 32. Since the hinge pin 42, in order to withstand the loads imposed thereon without encountering extraordinary amounts of wear, is often made of hardened steel and the bearings 30 and 32 for similar reasons are often made of surface hardened cold rolled steel, the slight movements encountered between the two elements of similar metals provide an environment conductive to galling of the materials. In order to minimize or prevent the possibility of such galling, lubrication is provided for the bushings 30 and 32. This is accomplished by providing cross bores 110 and 114 which communicate respectively with the clearance space between pin O.D. and bushing I.D. The bearings 30 and 32 are appropriately sealed by seals 118 and 120 respectively placed in annular grooves of these bushings adjacent their respective ends.

Referring now to the lower hinge assembly 16, the upper arm 22 and the lower arm 24, of the lower clevis, are provided with bearings 130 and 132 respectively while the tongue 28 is provided with a bearing 140. A hinge pin 142 extends through the bearings 130, 132 and 140 and is secured to the upper arm 22 by means of a plate 144 having an ear 146 which is engaged by a nut and cam device 145, in a fashion similar to that disclosed with respect to the upper hinge assembly 14. Lubrication for the bearings in the lower hinge assembly 16 is provided by an axial bore 200 communicating with a conduit 202 which also is connected with the return conduit 96. Cross bores 204, 210 and 214 communicate respectively with the clearance space between pin O.D. and bushing I.D. lubrication for the bearings 140, 130 and 132 respectively. Thus, each of the bearings or bushings in the lower hinge assembly 16 is provided with positive pressurized lubrication in a manner similar to that provided in the upper hinge assembly 14.

It will be appreciated from the foregoing description, that the present invention provides a hinge assembly which permits easy initial assembly, which automatically compensates for small misalignments in the various components, which provides constant and automatic adjustment to compensate for wear in the relatively movable parts, which provides positive lubrication, and which prolongs the life of the assembly by lubricating components normally considered to be stationary relative to each other but which would also normally be subject to galling.

What is claimed is:

1. A hinge assembly for articulating a pair of frame sections, comprising:
    a clevis affixed to one of the frame sections;
    a hinge plate affixed to the other of the frame sections and positioned between the clevis;
    an annular piston and cylinder assembly positioned between one side of the hinge plate and the clevis;
    a pair of mating bearing plates positioned between the hinge plate and one of said assembly and the clevis;
    a hinge pin extending through the clevis, the hinge plate, said assembly and said bearing plates and defining a pivot axis for the frame sections;
    means for admitting hydraulic fluid under pressure behind the piston for extending the annular piston from the cylinder;
    and check valve means for permitting flow of hydraulic fluid into the annular cylinder and preventing the exhaust of hydraulic fluid therefrom.

2. A hinge assembly for articulating a pair of frame sections, comprising:
    a clevis affixed to one of the frame sections and extending toward the other frame section;
    a hinge plate affixed to said other frame section and positioned between the clevis;
    a pair of bearing plates positioned between one side of the hinge plate and the clevis;
    an annular cylinder and piston assembly positioned between the other side of the hinge plate and the clevis;
    each of said clevis, hinge plate, bearing plates and said assembly being provided with transverse bores;
    a hinge pin extending through said bores;

means for admitting hydraulic fluid under pressure behind the piston to urge the piston toward the hinge plate;

and check valve means for permitting flow of hydraulic fluid into the annular cylinder and preventing the exhaust of hydraulic fluid therefrom.

3. A hinge assembly for pivotally connecting the frame sections of an articulated tractor having a source of hydraulic fluid under pressure, comprising:

a clevis affixed to one of the frame sections;

a hinge plate affixed to the other frame section and positioned between the clevis;

an annular cylinder and piston assembly positioned between the clevis and the hinge plate;

each of said clevis and hinge plate having a bore;

a hinge pin secured to the clevis and extending through said bores and said annular assembly;

and automatic hydraulic adjusting means including a one-way check valve connected with said source and communicating with the annular cylinder behind the piston to effect extension thereof.

4. A hinge assembly according to claim 5 and further comprising:

passages formed in the hinge pin and communicating with the bores in the clevis and the hinge plate;

and means for connecting said passages with said source.

5. A hinge assembly for articulating a pair of frame sections, comprising:

a first hinge plate having a bore therethrough secured to one of the frame sections;

a second hinge plate having a bore therethrough secured to the other frame section and overlying the first hinge plate;

a hinge pin extending through the bores and defining a pivot axis for the frame sections;

a cylinder means secured to said one frame section and positioned on the side of the second hinge plate opposite the first hinge plate;

a hydraulic piston means reciprocable within the cylinder means and capable of engaging the second hinge plate;

means for communicating hydraulic fluid under pressure to the cylinder means to urge the piston means against the second hinge plate;

and check valve means for permitting flow of hydraulic fluid into the cylinder means and preventing the exhaust of hydraulic fluid therefrom.

6. A hinge assembly for articulating a pair of frame sections comprising;

a clevis affixed to one of the frame sections and provided with substantially aligned bores;

a hinge plate affixed to the other frame section and having a bore therethrough;

a bushing secured in each of the bores;

a hinge pin secured to the clevis and extending through each of the bushings;

seal means provided at each end of the bushings and sealingly engaging the hinge pin;

passage means provided in the hinge pin and communicating with each bushing between the seal means;

and means for connecting the passage means with a source of hydraulic fluid under pressure.

7. A hinge assembly according to claim 6, and further comprising:

a flange formed on the upper end of the bushing in the hinge plate, the flange overlapping the hinge plate to preclude the bushing from being urged downward out of bore in the hinge plate.

8. A hinge assembly for connecting the front and rear frame sections of an articulated tractor, comprising:

a clevis affixed to the rear frame section;

a hinge plate affixed to the front frame section and positioned between the clevis;

a pair of mating bearing plates positioned between the lower surface of the hinge plate and the clevis;

an annular cylinder and piston assembly positioned between the upper surface of the hinge pin and the clevis;

a hinge pin extending through the clevis, the hinge plate, the bearing plates and said assembly to define a pivot axis for the frame sections;

means for directing hydraulic fluid pressure to the cylinder to extend the piston whereby small misalign and height adjustments are effected automatically and continuously;

and check valve means associated with said last-mentioned means for permitting flow of hydraulic fluid into said cylinder while preventing exhaust therefrom.

9. A hinge assembly for articulating the front and rear frame sections of a tractor having a source of hydraulic fluid under pressure, comprising:

a first hinge plate secured to one of the frame sections;

a cylinder and piston assembly secured to said one frame section;

a second hinge plate secured to the other of the frame sections and positioned between said first plate and said assembly;

a hinge pin extending through the first and second hinge plates and said assembly and defining a pivot axis for said frame sections;

means for directing hydraulic fluid from said source between the piston and the cylinder;

and check valve means associated with said last-mentioned means for permitting one-way flow of hydraulic fluid into the cylinder.

10. A hinge assembly according to claim 9, and further comprising:

a pair of mating annular bearing plates positioned between the first and second hinge plates.

11. A hinge assembly according to claim 10, and further comprising:

a bushing secured to each of the first and second hinge plates and engaging the hinge pin;

seal means at each end of each bushing to effect sealing between the hinge pin and the bushing;

passage means in the hinge pin communicating with each bushing between the seal means;

and conduit means for connecting the passage means with said source.

12. A hinge assembly for an articulated-steer tractor having front and rear frame sections and a source of hydraulic fluid under pressure, comprising:

upper and lower rear hinge plates secured to one frame section;

a front hinge plate secured to the other frame section and positioned between said rear hinge plates;

a pair of mating bearing plates positioned between the front hinge plate and the lower rear hinge plate;

a hinge pin secured to the upper rear hinge plate and extending through said plates to define a pivot axis for said frame sections;

an annular cylinder and piston secured to the upper rear hinge plate and capable of engaging the front hinge plate;

means for directing hydraulic fluid from said source between said piston and cylinder;

and check valve means associated with said last-mentioned means for permitting flow of said fluid only into the space between said piston and said cylinder.

* * * * *